(12) United States Patent
Shinomoto et al.

(10) Patent No.: US 8,910,064 B2
(45) Date of Patent: Dec. 9, 2014

(54) GUI PROGRAM CREATION SUPPORTING APPARATUS, GUI PROGRAM CREATION SUPPORT METHOD, COMPUTER-READABLE RECORDING MEDIUM AND INTEGRATED CIRCUIT

(75) Inventors: Yuki Shinomoto, Osaka (JP); Hideaki Yajima, Osaka (JP); Hidehiko Shin, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 170 days.

(21) Appl. No.: 13/700,828

(22) PCT Filed: Apr. 20, 2012

(86) PCT No.: PCT/JP2012/002737
§ 371 (c)(1),
(2), (4) Date: Nov. 29, 2012

(87) PCT Pub. No.: WO2012/176365
PCT Pub. Date: Dec. 27, 2012

(65) Prior Publication Data
US 2013/0111376 A1 May 2, 2013

(30) Foreign Application Priority Data

Jun. 20, 2011 (JP) ................................. 2011-136589

(51) Int. Cl.
*G06F 3/048* (2013.01)
*G06F 9/44* (2006.01)
(52) U.S. Cl.
CPC *G06F 3/048* (2013.01); *G06F 8/34* (2013.01); *G06F 8/38* (2013.01)
USPC ............................ 715/763; 715/762; 715/764

(58) Field of Classification Search
CPC .............. G06F 3/048; G06F 8/34; G06F 8/38
USPC ......................................... 715/763, 762, 764
See application file for complete search history.

(56) References Cited

U.S. PATENT DOCUMENTS 6,342,905 B1 * 1/2002 Diedrich et al. ............... 715/746
6,425,121 B1 * 7/2002 Phillips ......................... 717/109

(Continued)

FOREIGN PATENT DOCUMENTS

JP 10-207701 8/1998
JP 11-232087 8/1999

(Continued)

OTHER PUBLICATIONS

International Search Report issued Jul. 3, 2012 in International (PCT) Application No. PCT/JP2012/002737.

*Primary Examiner* — David Phantana Angkool
(74) *Attorney, Agent, or Firm* — Wenderoth, Lind & Ponack, L.L.P.

(57) ABSTRACT

In a case where a screen layout creating unit replaces a generated screen layout with another screen layout, a screen layout comparing unit infers a GUI component in the pre-replacement screen layout, that is similar to a GUI component in the post-replacement screen layout, and correlates the GUI components similar to each other. A connection information restoring unit executes connection restoring processing to associate a processing program, which is associated with the GUI component in the pre-replacement screen layout, with the GUI component correlated by the screen layout comparing unit.

16 Claims, 11 Drawing Sheets

(56) References Cited

U.S. PATENT DOCUMENTS

| | | | |
|---|---|---|---|
| 7,234,111 B2* | 6/2007 | Chu et al. | 715/251 |
| 7,337,406 B2 | 2/2008 | Imataki | |
| 7,441,200 B2* | 10/2008 | Savage | 715/762 |
| 7,730,410 B2* | 6/2010 | Goering | 715/741 |
| 7,895,064 B2* | 2/2011 | Wahlbin | 705/4 |
| 8,091,036 B1* | 1/2012 | Pavek et al. | 715/762 |
| 8,489,984 B1* | 7/2013 | Violet et al. | 715/243 |
| 8,495,679 B2* | 7/2013 | Labeeb et al. | 725/46 |
| 2002/0054100 A1 | 5/2002 | Imataki | |
| 2002/0080178 A1 | 6/2002 | Imataki | |
| 2004/0217985 A9* | 11/2004 | Ries et al. | 345/740 |
| 2005/0094205 A1* | 5/2005 | Lo et al. | 358/1.18 |
| 2013/0111376 A1* | 5/2013 | Shinomoto et al. | 715/763 |
| 2013/0125050 A1* | 5/2013 | Goshey | 715/800 |
| 2013/0212487 A1* | 8/2013 | Cote | 715/745 |
| 2014/0026084 A1* | 1/2014 | Gilboa | 715/763 |
| 2014/0101535 A1* | 4/2014 | Kim et al. | 715/234 |
| 2014/0122996 A1* | 5/2014 | Gupta et al. | 715/234 |
| 2014/0218624 A1* | 8/2014 | Kitabayashi | 348/744 |
| 2014/0282055 A1* | 9/2014 | Engel et al. | 715/744 |

FOREIGN PATENT DOCUMENTS

| | | |
|---|---|---|
| JP | 2006-276953 | 10/2006 |
| WO | 00/57271 | 9/2000 |

* cited by examiner

```
<patterns>
<pattern>list</pattern>
</patterns>
<ui_components>
<ui_component>
<name>Button_01</name>
<class>Button</class>
<x>100</x>
<y>100</y>
<witdth>50</width>
<height>100</height>
<text>push</text>
</ui_component>
</ui_components>
```
201

FIG.5

```
<connections>
<connection>
<ui>Button_01</ui>
<program>player_program</program>
<method>play</method>
</connection>
</connections>
```

```
var player_program= {};
var _this = player_program;
_this.play= function(){···};
_this.stop= function(){···};
_this.fforward= function(){···};
_this.rewind= function(){···};
```

```
var button1 = new button();

button1.setProgram(player_program);
button1.setProgramMethod("play");
```

204

GUI PROGRAM CREATION SUPPORTING APPARATUS, GUI PROGRAM CREATION SUPPORT METHOD, COMPUTER-READABLE RECORDING MEDIUM AND INTEGRATED CIRCUIT

TECHNICAL FIELD

The present invention relates to a technology to support creation of a GUI (Graphical User Interface) program, and more particularly to a technology to improve productivity of a GUI program.

BACKGROUND ART

Recently digital home electronic products such as personal computers, portable telephones and digital TVs (hereafter called apparatuses) normally have a GUI.

Creating a GUI program to execute a GUI on an apparatus, a GUI builder, to support the creation of a GUI program, is used to improve development efficiency.

Using a GUI builder, a designer arranges components constituting a GUI (GUI components), such as a button and an image, on an operation screen, and sets an attribute, such as size and color, for the arranged GUI components. The GUI builder creates a screen layout according to the GUI components arranged on the operation screen and the attributes which are set for each GUI component.

Using a GUI builder, the designer performs an operation to associate a processing program with each GUI component constituting the screen layout. Here the processing program, written in advance by a programmer, is a program storing processing to be executed when the user operates each GUI component.

If the designer ends the operation to associate the processing program with each GUI component, the GUI builder automatically generates a source code of the GUI program according to the screen layout and the processing program associated with each GUI component constituting the screen layout. An example of such a GUI builder has been disclosed in Patent Document 1.

In the case of the GUI builder disclosed in Patent Document 1 however, when the processing program replaces an associated screen layout with another screen layout, means of simplifying the operation to associate the processing program with each GUI component constituting the screen layout after the replacement is not considered at all.

Patent Document 1: Japanese Patent Publication No. 4197095

SUMMARY OF THE INVENTION

It is an object of the present invention to provide a technology to improve development efficiency when a new GUI program is developed by replacing a screen.

A GUI program creation supporting apparatus according to an embodiment of the present invention comprises: a screen layout creating unit that generates a screen layout of a GUI (Graphical User Interface) including a plurality of GUI components based on an operation input by a user, and replaces a generated screen layout with another screen layout; a processing program creating unit that, based on an operation input by the user, creates a processing program related to processing to be executed when any of the GUI components is operated; a connection setting unit that, based on an operation input by the user, associates the GUI component with the processing program, and generates connection information to indicate the association; a source code generating unit that generates a source code of a GUI program based on the screen layout, the processing program and the connection information; a screen layout comparing unit that, in the case where the generated screen layout is replaced with another screen layout by the screen layout creating unit, infers a GUI component in the pre-replacement screen layout, that is similar to a GUI component in the post-replacement layout, and correlates the GUI components similar to each other; and a connection information restoring unit that executes connection restoring processing to associate the processing program, which is associated with the GUI component in the pre-replacement screen layout, with the GUI component correlated by the screen layout comparing unit.

BRIEF DESCRIPTION OF THE DRAWINGS

FIG. 1 is a block diagram depicting a GUI program creation supporting apparatus according to an embodiment of the present invention.

FIG. 2 is an example of an input screen which is displayed on a display when a screen layout creating unit generates a screen layout.

FIG. 3 is an example of a screen layout definition information.

FIG. 4 is an example of an input screen which is displayed when a user performs an operation to associate a GUI component and a processing program.

[FIG. 5] FIG. 5 is an example of connection information.

[FIG. 6] FIG. 6 is an example of a processing program.

[FIG. 7] FIG. 7 is an example of a source code.

[FIG. 8]

FIG. 9 is a flow chart depicting GUI program creating processing executed by the GUI program creation supporting apparatus according to an embodiment of the present invention.

FIG. 10 is a flow chart depicting processing to replace a screen layout.

FIG. 11 is a flow chart depicting a sub-routine of S2300 in FIG. 10.

FIG. 12 is a block diagram depicting a GUI builder according to a comparison example.

FIG. 13 is a block diagram depicting a hardware configuration of the GUI program creation supporting apparatus according to an embodiment of the present invention.

DESCRIPTION OF EMBODIMENTS

Figure 12:
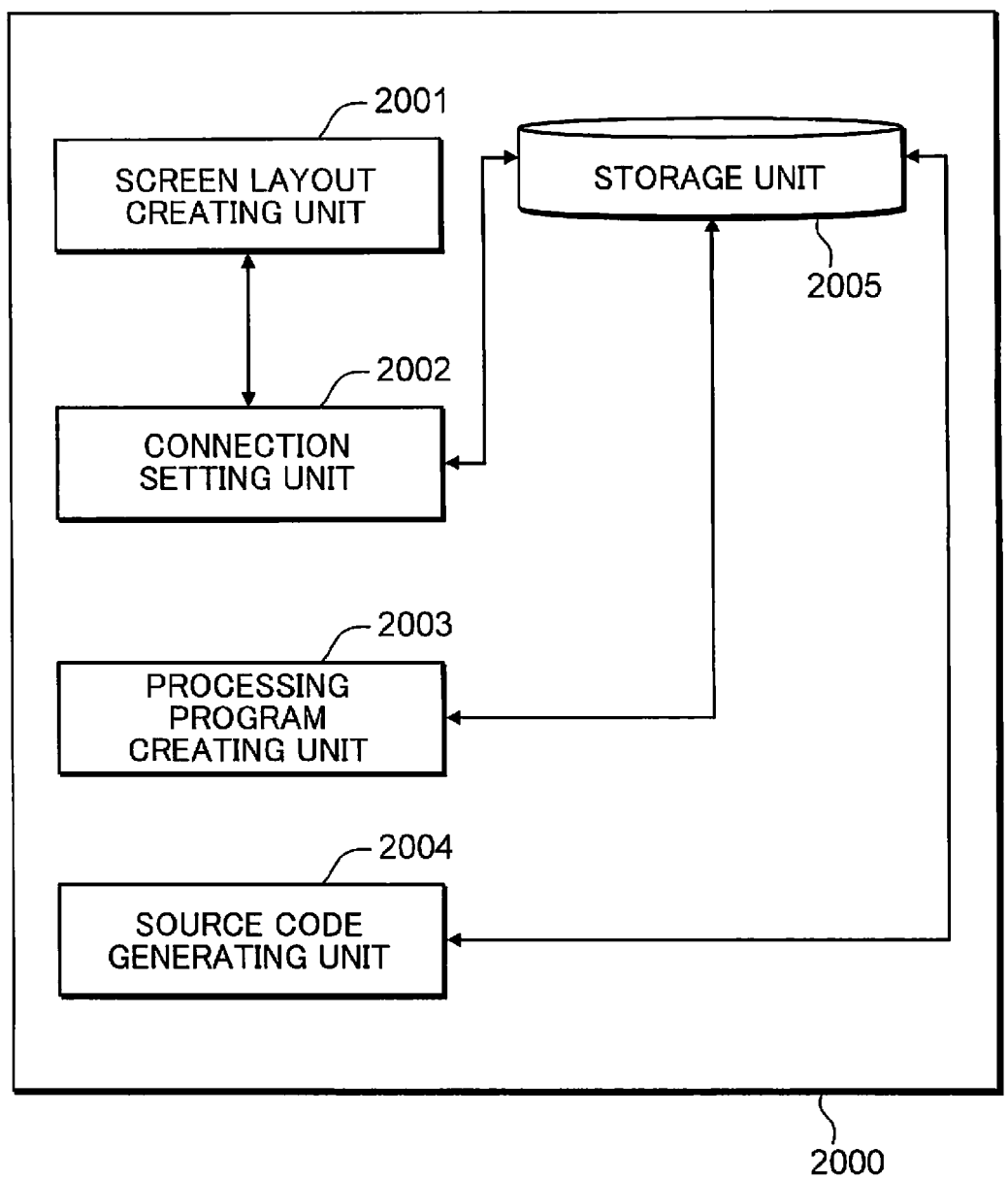
[FIG. 12]

Details on Background of the Invention of the GUI Program Creation Supporting Apparatus According to an Embodiment FIG. 12 is a block diagram depicting a configuration of a GUI builder according to a comparison example. In FIG. 12, the GUI builder 2000 of the comparison example comprises a screen layout creating unit 2001, a connection setting unit 2002, a processing program creating unit 2003, a source code generating unit 2004 and a storage unit 2005.

The screen layout creating unit 2001 generates a screen layout of a GUI based on an operation input by a user. The connection setting unit 2002 associates a processing program with a GUI component constituting a screen layout based on an operation input by the user, and generates connection information which indicates a connection relationship between the GUI component and the processing program. The processing program creating unit 2003 creates a processing program according to an operation input by a programmer. The source code generating unit 2004 generates a source code of a GUI program based on the screen layout, the processing program and the connection information. The storage unit 2005 stores the screen layout, the processing program, the connection information and the source code of the GUI program.

In the case of the GUI builder shown in FIG. 12 however, if a screen layout with which a processing program is associated is replaced with a different screen layout, the user must perform an operation to associate the processing program with each GUI component constituting the post-replacement screen layout one-by-one, which takes a very long time.

Especially when the post-replacement screen layout is created by modifying the pre-replacement screen layout with minor changes, the user must repeat almost the same operations as those performed for the pre-replacement screen layout, which creates an enormous burden on the user.

With the foregoing in view, it is an object of the present embodiment to provide a technology to improve the development efficiency when a new GUI program is developed by replacing a screen layout.

(Description of GUI Program Creation Supporting Apparatus According to an Embodiment of this Invention)

Figure 1:
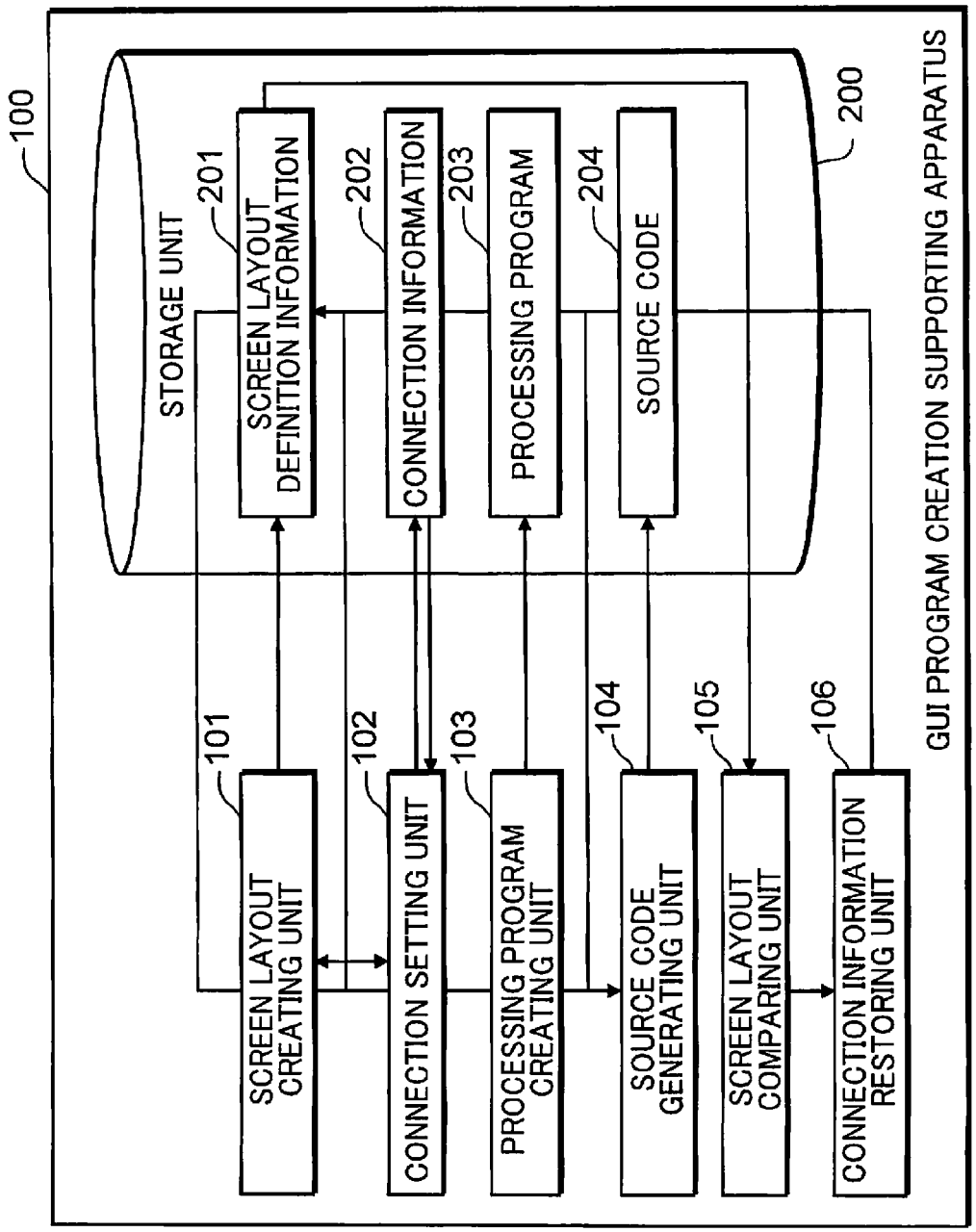
[FIG. 1]

An embodiment of the present invention will now be described with reference to the drawings. FIG. 1 is a block diagram depicting a GUI program creation supporting apparatus 100 according to an embodiment of the present invention. The GUI program creation supporting apparatus 100 is configured by a computer provided with a central processing unit, storage devices such as a ROM, a RAM and hard disk, an output device such as a display, and an input device such as a keyboard.

The GUI program creation supporting apparatus 100 comprises a screen layout creating unit 101, a connection setting unit 102, a processing program creating unit 103, a source code generating unit 104, a screen layout comparing unit 105, a connection information restoring unit 106, and a storage unit 200. Here the screen layout creating unit 101 to the connection information restoring unit 106 are constituted by program modules executed by a CPU, for example.

Figure 2:
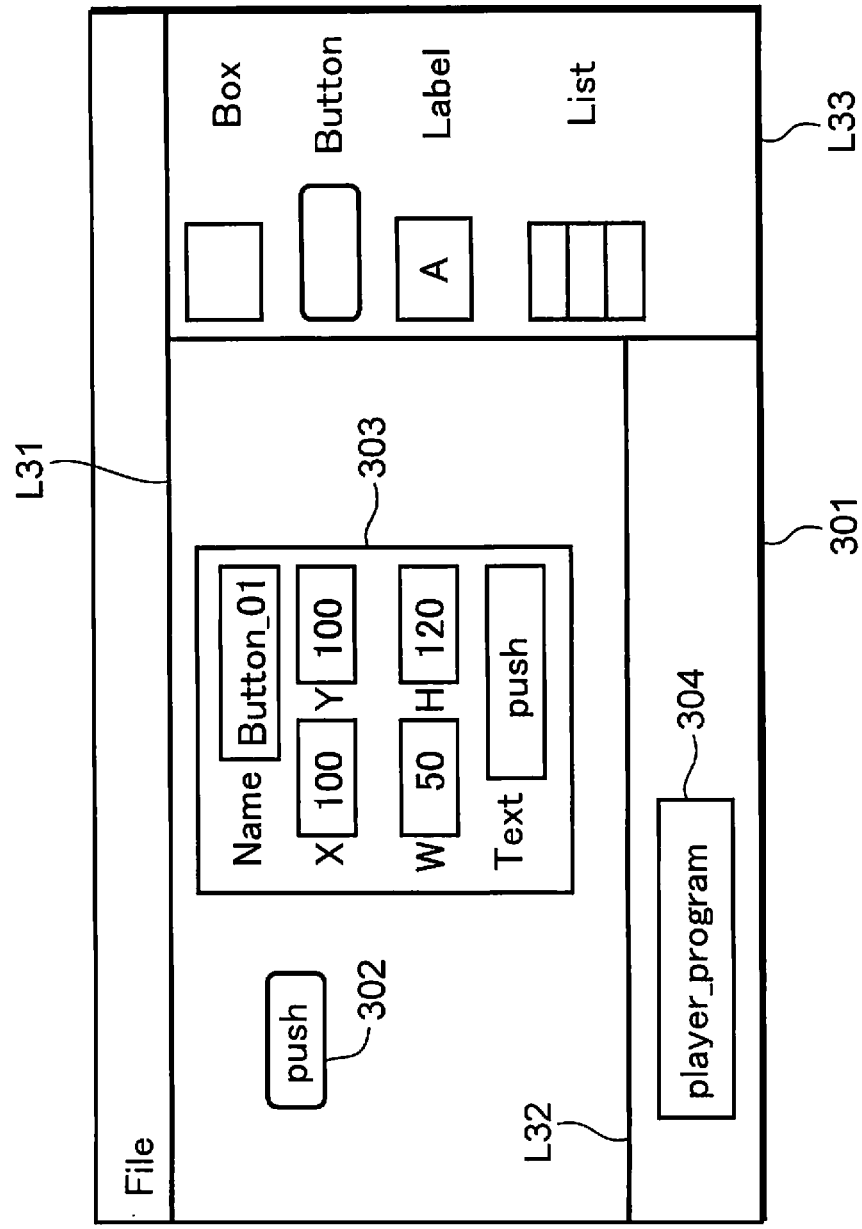
[FIG. 2]

The screen layout creating unit 101 generates a screen layout of a GUI, including a plurality of GUI components, based on an operation input by the user. FIG. 2 is an example of an input screen 301 which is displayed on the display when the screen layout creating unit 101 generates a screen layout. The screen layout creating unit 101 receives an operation inputted by the user via this input screen 301.

The input screen 301 is provided with a work area L31, a program arrangement area L32, and a GUI component selecting area L33.

The work area L31 is created at the center of the input screen 301, where a GUI component 302 is disposed based on an operation input by the user. The work area L31 corresponds to the screen layout, and each position of the work area L31 corresponds to each position of the screen layout. In the operation area L31, an X axis is specified in the horizontal direction (lateral direction) and a Y axis is specified in the vertical direction (longitudinal direction), and each position is specified by the X coordinate and the Y coordinate. Therefore each position of the screen layout is also specified by the X coordinate and the Y coordinate in the work area L31.

The program arrangement area L32 is disposed in a lower portion of the input screen 301, where an icon 304, to indicate a processing program that can be associated with a GUI component, is displayed. In the case of the example in FIG. 2, one icon 304 is written as player_program is displayed. If there is a plurality of processing programs that can be associated with GUI components, an icon 304 of each processing program is displayed in the program arrangement area L32.

The GUI component selecting area 33, which lists a predetermined plurality of GUI components that a user can select, is created on the right side in the input screen. In the case of the example in FIG. 2, Box, Button, Label and List are included in the GUI components.

The user selects a desired GUI component from the GUI components displayed in the GUI component selecting area L33 by clicking on an icon thereof by a mouse, for example. Then the user drags and drops the selected GUI component in the work area L31. Thereby the GUI component is added to the screen layout under creation.

The screen layout creating unit 101 is also provided with a function to set attributes of a GUI component. The attributes of a GUI component include a name, a position, a size and a character string, for example. The name attribute defines a name assigned to the GUI component. The position attribute defines a position in the work area L31 where the GUI component is disposed. The character string attribute defines a character string displayed in the GUI component.

In FIG. 2, it is assumed that the user double clicked on the GUI component 302 displayed in the work area L31 using a mouse. Then the screen layout creating unit 101 displays an attribute setting panel 303 at a position adjacent to the GUI component 302, so as to set the attributes of the GUI component 302.

The user sets the attributes of the GUI component 302 by inputting an attribute value in the input section of each attribute created in the attribute setting panel 303.

In the attribute setting panel 303 of the example in FIG. 2, an attribute value of the name is inputted in the "Name" section, attribute values of the position are input in the "X" and "Y" sections, attribute values of the size are inputted in the "W" and "H" sections, and an attribute value of the character string is inputted in the "Text" section.

"Button_01" is written in the "Name" section. This means that the attribute value of the name of the GUI component 302 is "Button_01".

"100" and "100" are written respectively in the "X" and "Y" sections. This means that the attribute values of the position of the GUI component 302 is 100 for the X coordinate, and 100 for the Y coordinate. In other words, the GUI component 302 is disposed at a position of (X, Y)=(100, 100) in the screen layout.

If the user moves the GUI component 302 using a mouse in the work area L31, the position of the GUI component 302 in the work area L31 is reflected in the "X" and "Y" sections. In other words, the user can set the attribute values of the position of the GUI component 302 by directly inputting the attribute values in the "X" and "Y" sections, or by moving the GUI component 302 using the mouse.

"50" and "120" are written in the "W" and "H" sections respectively. This means that the attribute values of the size of the GUI component 302 is "50" in the horizontal direction, and "120" in the vertical direction. In this case, the GUI component 302 has a rectangular size of 50×120.

"push" is written in the "Text" section. This means that the attribute of the character string of the GUI component 302 is "push", and the character string "push" is superimposed on the GUI component 302.

Once the operation for the user to arrange a GUI component in the work area L31 and to set the attributes for the arranged GUI component ends, the screen layout creating unit 101 generates screen layout definition information 201 where the attributes of each GUI component are defined, and stores this information in the storage unit 200. Thus the screen layout creating unit 101 generates the screen layout by generating the screen layout definition information 201 in which the screen layout is defined.

Figures 3, 4:
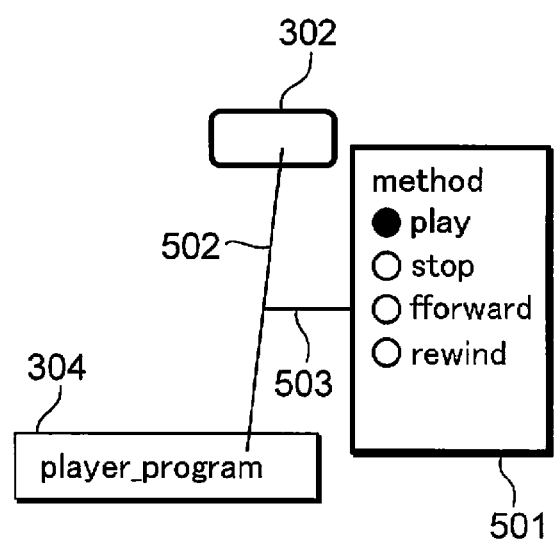
[FIG. 3]
[FIG. 4]

The screen layout definition information 201 is written in XML (eXtensible Markup Language), for example. FIG. 3 is an example of the screen layout definition information 201. In the example in FIG. 3, the screen layout definition information 201 of the screen layout, including the GUI component 302, is shown.

The GUI component 302 belongs to a button component class. Therefore in the example in FIG. 3, "Button" is written in the tag <class>. Here the component class defines a type of GUI component. Other examples of the component class are label, list and box. This means that the types of GUI component, other than button, are label, list and box, for example.

The attributes of the position of the GUI component 302 are (X, Y)=(100, 100). Therefore "100" is written in the tag <x>, and "100" is written in the tag <y>.

The attributes of the size of the GUI component 302 are (W, H)=(50, 100). Therefore "50" is written in the tag <width>, and "100" is written in the tag <height>.

The attribute of the character string of the GUI component 302 is "push", so "push" is written in the tag <text>.

The screen layout creating unit 101 has a function to replace the screen layout created by the above mentioned operations with a stored screen layout based on the operation input by the user.

Referring back to FIG. 1, the connection setting unit 102 associates a GUI component and a processing program based on the operation input by the user, generates connection information 202 which indicates this association, and stores this information in the storage unit 200. In concrete terms, if the user selects the GUI component 302 arranged in the work area L31 in FIG. 2 using a mouse in a state of pressing a specific key on a keyboard, and drags and drops the GUI component 302 to the icon 304 arranged in the program arrangement area L32 in FIG. 2, the connection setting unit 102 requests the screen layout creating unit 101 to display the input screen shown in FIG. 4.

FIG. 4 is an example of the input screen which is displayed when the user performs the operation to associate a GUI component and a processing program.

In the input screen in FIG. 4, the GUI component 302 and the icon 304 are connected with a line 502. A line 503 branches from a center of the line 502, and a method list 501 is displayed at the end of the line 503.

In the method list 501, a plurality of methods owned by the processing program (player_program) indicated by the icon 304 is displayed as a list. In the example in FIG. 4, the methods "play", "stop", "fforward" and "rewind" are displayed. The user selects one or a plurality of methods from these methods, and associates the processing program with the GUI component 302. In the example in FIG. 4, the method "play" is indicated with a black dot, which is selected by the user. In this case, the connection setting unit 102 associates the method "play" of player_program with the GUI component 302. Thus according to the present embodiment, the processing program is associated with the GUI component, and a method included in the processing program is also associated with the GUI component.

FIG. 5 is an example of the connection information 202. As FIG. 5 shows, the connection information 202 is written in XML, for example. This however is an example, and any language can be used to describe the connection information 202 if the computer can interpret the language.

FIG. 5 shows the connection information 202 for the GUI component 302 shown in FIG. 2. In FIG. 5, "Button_01", which is a name of the GUI component 302, is written in the tag <ui>. "player_program", which is a name of the processing program, is written in the tag <program>. Thereby the processing program of "player_program" is associated with the GUI component 302.

"play", which is a name of an associated method in the processing program, is written in the tag <method>. Thereby the "play" method is associated with the GUI component 302.

According to this embodiment, the connection information 202 is generated for each GUI component, for example, and is stored in the storage unit 200. An attribute value of the name of the GUI component is written for the connection information 202. Therefore the connection information 202 of the GUI component 302 can be specified using the attribute value of the name of the GUI component 302 as a key, whereby the processing program associated with the GUI component can be specified.

Based on the operation input by the user, the processing program creating unit 103 creates a processing program 203 related to processing which is executed when the GUI component is operated. In concrete terms, the processing program creating unit 103 is constituted by a text editor, for example, which creates and edits the processing program 203. The created processing program 203 is stored in the storage unit 200.

The processing program 203 is written in JavaScript®, for example, and is provided with at least one method. FIG. 6 is an example of the processing program 203.

The processing program 203 named "player_program" in FIG. 4 is shown in the example in FIG. 6. On the first line in FIG. 6, "player_program" is written to declare the name of the program "player_program".

As FIG. 4 shows, "player_program" is provided with the methods "player", "stop", "fforward" and "rewind". Hence these methods are defined in each of the third to sixth lines in FIG. 6. In the example in FIG. 6, detailed program code of each method is omitted.

It is assumed that a user who creates the processing program 203 is mainly a programmer, which is different from a designer who creates a screen layout.

The apparatus to execute a method may be different from an apparatus to display a GUI. In other words, if an apparatus to display a GUI is connected to a server via a network, and the user operates a GUI component, the apparatus notifies the server of the operation information on the GUI component. Based on the operation information, the server may execute the method associated with the GUI component, and return the processing result to the apparatus.

In such a case, the apparatus in which the GUI is installed need not be provided with the processing program 203. In this way, the processing program 203 may exist in a same apparatus as the apparatus in which the GUI is installed, or may exist in a different apparatus connected via a network.

The source code generating unit 104 creates a source code 204 of a GUI program based on the screen layout definition information 201, the connection information 202 and the processing program 203. The created source code 204 is stored in the storage unit 200. The source coded 204 is written in Java®Script, for example.

The screen layout creating unit 101 can change the setting of the screen layout so that the screen layout exists in an apparatus that is different from the apparatus in which the processing program is installed. In this case, the source code generating unit 104 generates a source code 204 for the GUI component on the screen layout to access, via a network, the apparatus in which the processing program 203 is installed.

FIG. 7 is an example of a source code 204. A source code 204 for the GUI component 302 is shown in the example in FIG. 7.

On the first line, "button1", which is an object belonging to the button component class is declared. On the second line, "button1.setProgram (player_program) is written, so as to associate the object "button1" with "player_program".

On the third line, "button1.setProgramMethod ("play") is written, so as to associate the object of button1 with the method "play".

Therefore the apparatus in which the source code 204 is installed executes the method "play" of the player_program if the GUI component 302 is operated.

In this way, the source code generating unit 104 analyzes the screen layout definition information 201, extracts the attributes that indicate a type and display position of each GUI component on the screen layout, generates a source code 204 for each GUI component, and registers the extracted attributes in the source code 204. In the example in FIG. 7, the attributes of the GUI component are omitted in the description. Further, the source code generating unit 104 analyzes the connection information 202, and extracts the processing program 203 and the method thereof associated with each GUI component. When an event (e.g. an event where the user clicks on the GUI component) is generated in the GUI component, the source code generating unit 104 writes a code, to call up the processing program 203 and the method associated with the GUI component, in the source code 204. Thereby if an event is generated in the GUI component, the source code 204 is interpreted and the associated method of the processing program is executed.

According to this embodiment, the source code 204 is generated for each GUI component, and is included in one file in screen layout units.

Referring back to FIG. 1, the storage unit 200 is constituted by an HDD (Hard Disk Drive), for example, which stores the screen layout definition information 201, the connection information 202, the processing program 203 and the source code 204.

If the screen layout creating unit 101 replaced the generated screen layout with a different screen layout, the screen layout comparing unit 105 infers a GUI component in the pre-replacement screen layout, that is similar to a GUI component in the post-replacement screen layout, and correlates the GUI components similar to each other. This inference will be described in detail later.

The connection information restoring unit 106 performs connection restoring processing for associating a processing program, which has been associated with the GUI component in the pre-replacement screen layout, with the GUI component correlated by the screen layout comparing unit 105.

In the case of creating a different screen layout replacing a generated screen layout using a conventional GUI builder, the user must manually perform operation to associate a processing program with each GUI component in the post-replacement screen layout one-by-one.

A post-replacement screen layout is often created, for example, by deleting a part of the GUI components from the pre-replacement screen layout, adding new GUI components to the pre-replacement screen layout, or changing the positions of the GUI components of the pre-replacement screen layout. This means that it is highly possible that many GUI components in the post-replacement screen layout are the same as those in the pre-replacement screen layout. Therefore if the user must perform an operation to associate a processing program with each GUI component in the post-screen layout one-by-one, as in the case of a conventional GUI builder, then the burden on the user becomes heavy.

Therefore according to this embodiment, for each GUI component in the post-replacement screen layout, a similar GUI component is inferred in the pre-replacement screen layout, and if a GUI component in the post-replacement screen layout is inferred to have a similar GUI component in the pre-replacement screen layout, a processing program associated with the similar GUI component is automatically associated with this GUI component in the post-replacement screen layout.

Therefore the operation to associate a processing program with each GUI component in the post-replacement screen layout is simplified, and development efficiency of the GUI screen layout can be dramatically improved.

In concrete terms, the connection information restoring unit 106 updates an attribute value of a name of a GUI component in the post-replacement screen layout after performing the connection restoring processing, to an attribute value of a name of a correlated GUI component in the pre-replacement screen layout. For example, if an attribute value of a name of a GUI component in the post-replacement screen layout is "Button_01", and an attribute value of a name of the correlated GUI component in the pre-replacement screen layout is "Button_A", then the attribute value of the name of the GUI component in the post-replacement screen layout is updated to "Button_A".

Thereby the processing program and a method associated with the GUI component in the pre-replacement screen layout are associated with the GUI component in the post-replacement screen layout.

In other words, the connection information 202 and the source code 204 of the GUI component in the post-replacement screen layout are associated with the screen layout definition information 201 of the pre-replacement screen layout using a "Button_A" as a key, which is an attribute value of the name of the GUI component in the pre-replacement screen layout. Therefore if the attribute value of the name of the GUI component in the post-replacement screen layout is updated to an attribute value of the name of the GUI component in the pre-replacement screen layout, the processing program and a method of the processing program of the GUI component in the pre-replacement screen layout can be associated with the GUI component in the post-replacement screen layout, without generating a new connection information 202 and a source code 204 of the GUI component in the post-replacement screen layout.

Further, the connection information restoring unit 106 notifies the user of a GUI component correlated by the screen layout comparing unit 105, and executes the connection restoring processing for a GUI component for which the user inputs an operation to confirm that this inference result about the GUI component is correct.

For example, in some cases for a GUI component in post-replacement screen layout, it may be inferred that a GUI component, which is different from the GUI component the user assumes as a similar GUI component, may be inferred. If the connection restoring processing is automatically executed in this case, the user must clear the association and perform an operation to associate a desired processing program and a method with the GUI component in the post-replacement screen layout again. Then operation efficiency drops somewhat for the user.

Hence a configuration to prompt the user whether or not the inference result is correct is used. Then the user can determine in advance whether or not the inference result is correct, and associating a processing program with a GUI component in the post-replacement screen layout, against user' intention, is prevented, and operation efficiency can be improved.

For this prompting, an attribute value of a name of a GUI component in the post-replacement screen layout and an attribute value of a name of a GUI component in the pre-replacement screen layout are correlated and displayed, and a dialog box including a selection item "Correct" or Not correct" is displayed on the screen. This dialog box is displayed repeatedly for the number of GUI components.

Or a correlation is displayed as a list for all the GUI components, and one dialog box including a selection item "Correct" or "Not correct" is displayed for each correlation on the screen. Or the pre-replacement screen layout and the post-replacement screen layout are displayed side by side, where the correlation of GUI components is expressed with a line connecting the GUI components, and the user deletes a line indicating an incorrect correlation.

The above is a description on the configuration of the GUI program creation supporting apparatus 100.

(Flow Chart)

Figure 9:
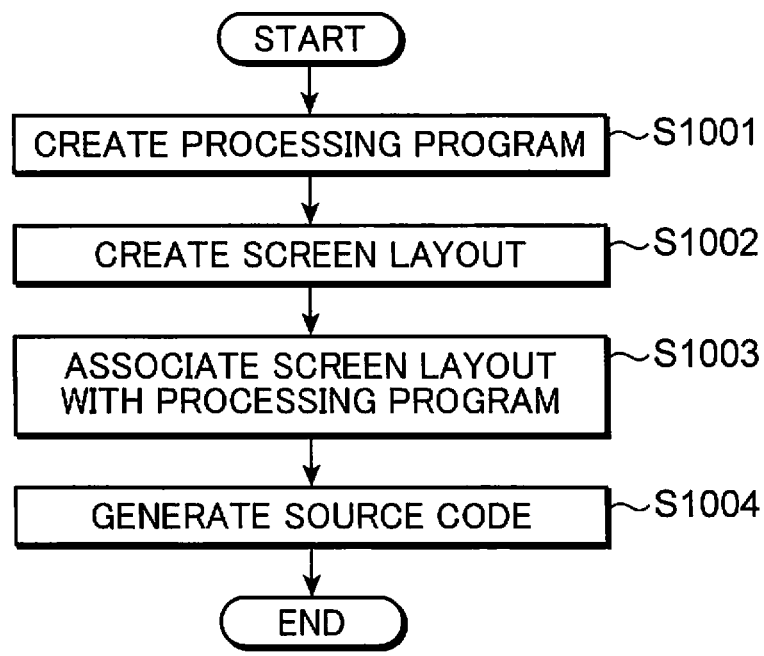
[FIG. 9]

Processing executed by the GUI program creation supporting apparatus 100 according to this embodiment will now be described. FIG. 9 is a flow chart depicting GUI program creating processing executed by the GUI program creation supporting apparatus 100 according to an embodiment of the present invention.

First based on an operation input by the user, the processing program creating unit 103 creates a processing program 203 for a GUI component, as shown in FIG. 6 (S1001). The created processing program 203 is stored in the storage unit 200. If the processing program 203 is stored, an icon 304, to indicate the processing program 203, is displayed in the program arrangement area L32 shown in FIG. 2.

Then based on the operation input by the user, the screen layout creating unit 101 arranges the GUI components and creates a screen layout (S1002). In this case, a unique attribute value of a name is set for each GUI component. The attribute value of the name may be automatically assigned by the screen layout creating unit 101, or may be specified by the user. In the case of the screen layout creating unit 101 automatically assigning a name, an attribute value of a name, that consists of a character string to indicate a class or a label and a numeric value to indicate a creation sequence, can be assigned. For example, "Button_01" is assigned to a GUI component that belongs to a button component class as a first button, and "Button_02" is assigned to a GUI component that belongs to a button component class as a second button.

When the operation to create the screen layout by the user ends, the screen layout creating unit 101 generates screen layout definition information 201 for defining the screen layout, and stores this information in the storage unit 200. Thereby the screen layout is stored in the storage unit 200. In this case, the screen layout creating unit 101 allows the user to input a file name of the screen layout definition information 201, and stores the screen layout definition information 201 having this file name in the storage unit 200.

By specifying a file name, the user can display the created screen layout defined by the screen layout definition information 201 having the specified file name on the display.

If the user edited a created screen layout, the screen layout creating unit 101 generates screen layout definition information 201 for the edited screen layout when the editing operation ends, and stores this information by overwriting the original screen layout definition information 201.

Figure 8A:
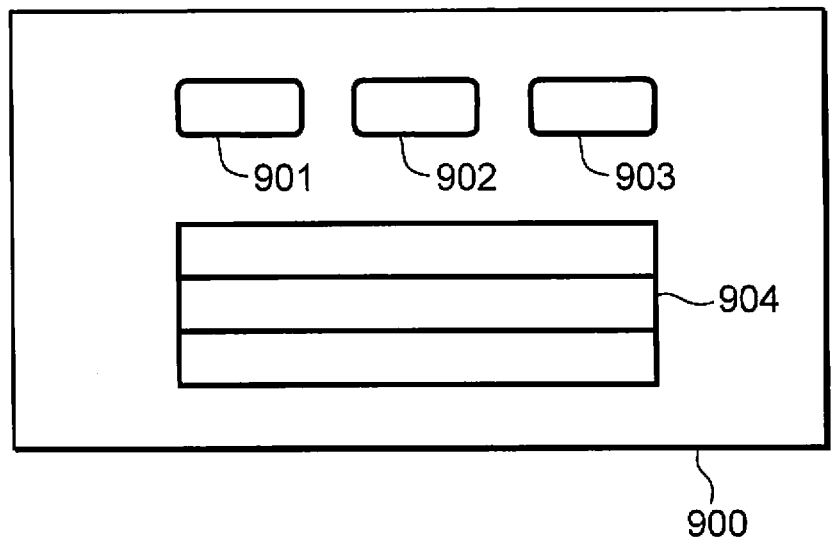
FIG. 8A is an example of a pre-replacement screen layout.

FIG. 8A is an example of the screen layout 900 created by the screen layout creating unit 101. Hereafter the screen layout 900 in FIG. 8A will be described as a pre-replacement screen layout.

Then based on the operation input by the user, the connection setting unit 102 associates each GUI component, constituting the screen layout 900 created by the screen layout creating unit 101, with a processing program 203 (S1003).

In the case of the example in FIG. 8A, a GUI component 901 is a GUI component in a button class, and is associated with a "play" method of the processing program 203 by the user. Therefore the connection setting unit 102 generates connection information 202 that associates the GUI component 901 with the "play" method of the processing program 203.

The connection setting unit 102 also associates the other GUI components 902 to 904 with the processing program 203 in the same manner, so as to generate the connection information 202. The generated connection information 202 is stored in the storage unit 200.

Then the source code generating unit 104 generates a source code 204 of the GUI program as shown in FIG. 7, based on the content of the processing program 203 associated with each GUI component, screen layout definition information 201 that defines the screen layout 910, and connection information 202 (S1004). The generated source code 204 is stored in the storage unit 200.

The processing program 203 is read by the apparatus and becomes available when the GUI program starts. Therefore explicit initialization processing is not defined in the source code 204. However if the initialization processing is explicitly defined in the source code 204, only the definition of the processing program may be written in the processing program 203, and the processing program 203 may be initialized in the source code 204.

The above concerns the GUI program creating processing.

Figure 10:
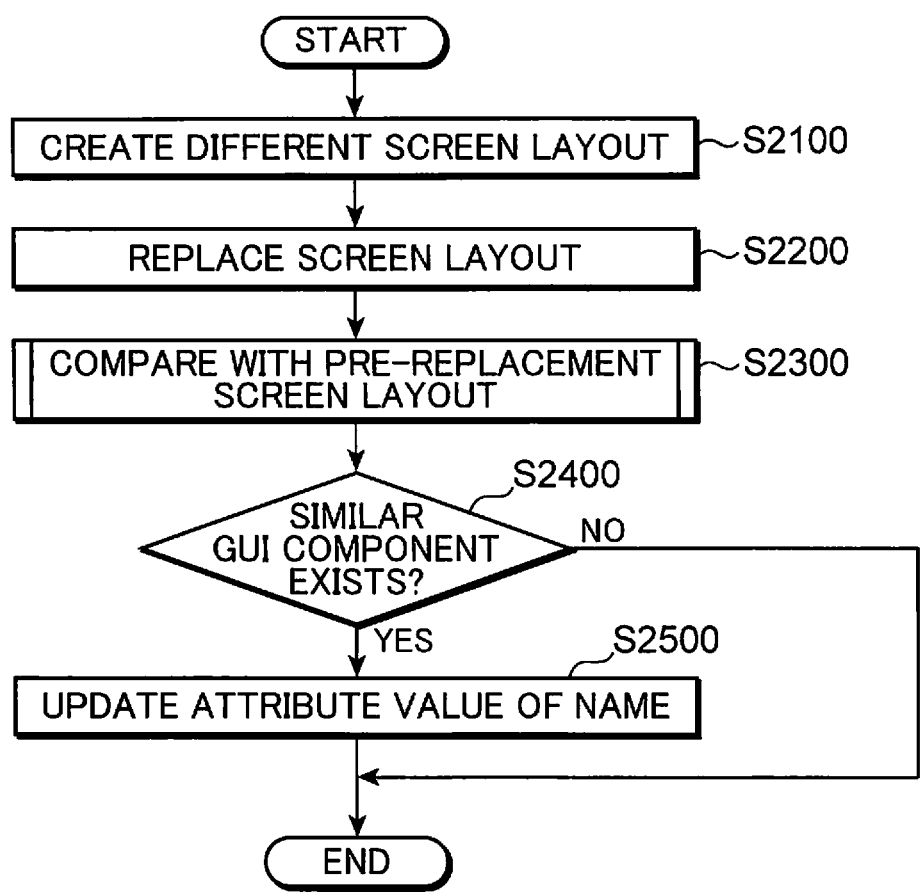
[FIG. 10]

Now processing when a screen layout is replaced will be described. FIG. 10 is a flow chart depicting the processing when the screen layout is replaced.

Figure 8B:
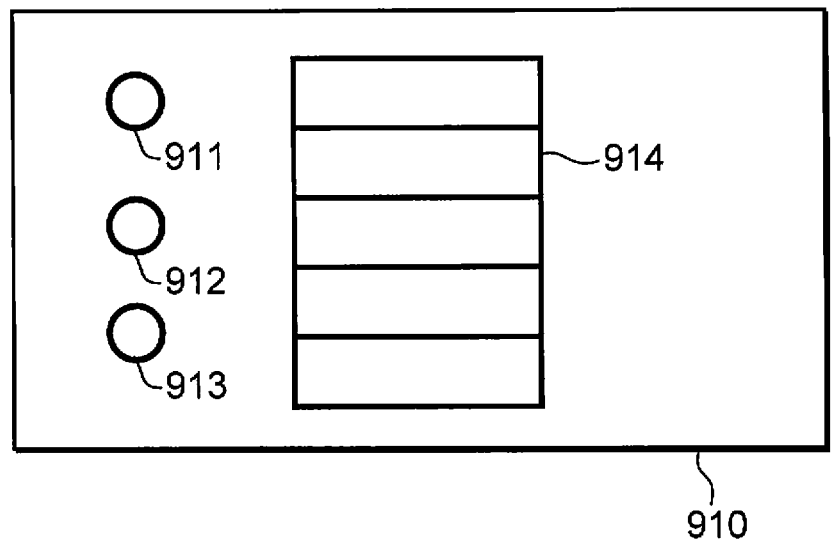
FIG. 8B is an example of a post-replacement screen layout.

First the screen layout creating unit 101 creates a screen layout 910, which is different from the screen layout 900, in the same manner as S1002 (S2100). Then the screen layout creating unit 101 creates screen layout definition information 201 for defining the screen layout 910, and stores this information in the storage unit 200. Here the screen layout creating unit 101 ends the processing to create the screen layout 910. FIG. 8B is an example of the screen layout 910. Hereafter the screen layout 910 is described as a post-replacement screen layout.

Then based on the operation input by the user, the screen layout creating unit 101 replaces the screen layout 900 with the screen layout 910 (S2200).

In concrete terms, in a state where the screen layout 910 is displayed on the screen, the screen layout creating unit 101 receives an instruction from the user to replace the screen layout. Then the screen layout creating unit 101 displays a list of file names of the screen layout definition information 201 stored in the storage unit 200. If the user selects one file of screen layout definition information 201, the screen layout creating unit 101 displays the screen layout 900 defined by the selected screen layout definition information 201 on the screen as the pre-replacement screen layout.

Then the screen layout creating unit 101 displays a dialog box on the screen, so as to prompt the user if it is OK to replace the screen layout 900 with the screen layout 910. If the user inputs an operation to permit replacement, the screen layout creating unit 101 recognizes the screen layout 900 as a target screen layout which is replaced with the screen layout 910. If the user inputs an operation not to permit replacement, on the other hand, the screen layout creating unit 101 displays the list of file names of the screen layout definition information 201 again, and prompts the user to select a different screen layout.

When the screen layout 900, which is replaced with the screen layout 910, is recognized, the screen layout creating unit 101 displays the screen layout 910 on the screen again.

Then the screen layout comparing unit 105 compares the screen layout 900 and the screen layout 910, and infers a GUI component in the screen layout 900, that is similar to the GUI component constituting the screen layout 910 (S2300). Here the screen layout comparing unit 105 correlates GUI components similar to each other, writes this information in the inference data, and stores this data in the storage unit 200.

Then based on the inference data generated by the screen layout comparing unit 105, the connection information restoring unit 106 determines whether the GUI component, which was inferred as being similar to the GUI component in the screen layout 910, exists in the screen layout 900 (S2400). If it is determined that the similar GUI component exists (YES in S2400), the connection information restoring unit 106 advances the processing to S2500, and if it is determined that the similar GUI component does not exist (NO in S2400), the connection information restoring unit 106 ends the processing.

Then the connection information restoring unit 106 updates the attribute value of the name of the GUI component in the screen layout 910, which was inferred that a similar GUI component exists, to the attribute value of the name of the similar GUI component (S2500). Thereby the processing program and the method of the GUI component in the screen layout 900 are associated with the correlated GUI component in the screen layout 910.

For example, it is assumed that the GUI component 901 and the GUI component 911 are similar, and the attribute value of the name of the GUI component 911 is "Button_01", and the attribute value of the name of the GUI component 901 is "Button_A". In this case, the connection information restoring unit 106 updates the attribute value of the name of the GUI component 911 in the screen layout 910 from "Button_01" to "Button_A".

For the GUI components 912 to 914, other than the GUI component 911, constituting the screen layout 910 as well, the connection information restoring unit 106 updates the attribute value of the name to the attribute value of the name of the correlated GUI component, just like the case of the GUI component 911, if a similar GUI component exists in the screen layout 900.

In S2500, if the attribute value of the name generated by updating the attribute value of the name of the GUI component overlaps with another GUI component, then the connection information restoring unit 106 can change the overlapped names of the GUI components appropriately.

For example, it is assumed that the attribute value of the name of the GUI component 911 was updated to "Button_A", but the attribute value of the name of the GUI component 912 is "Button_A" in the screen layout 910.

In this case, the connection information restoring unit 106 may change the attribute value of the name of the GUI component 911 to an attribute value that is different from "Button_A" (e.g. to "Button_A'"), or may change the attribute value of the name of the GUI component 912 from "Button_A" to "Button_A'".

If the attribute value of the name of the GUI component 911 is changed to "Button_A", the attribute value of the name of the GUI component 901 in the screen layout 900 is changed from "Button_A" to "Button_A'", and the key of the connection information 202 and the source code 204 of the GUI component 901 are changed from "Button_A" to "Button_A'". Then association of the GUI component 901 and the processing program 203 can be maintained.

In S2500, the connection information restoring unit 106 may present a candidate of a GUI component of which attribute value of the name can be updated, and prompt the user if the attribute value of the name will actually be updated.

If a similar GUI component does not exist in S2400 (NO in S2400), the connection information restoring unit 106 may display the screen layout 900 and the screen layout 910, so that the user can specify a GUI component in the screen layout 900 that is similar to the GUI component in the screen layout 910. In this case, the connection information restoring unit 106 can update the attribute value of the name of the GUI component in the screen layout 910 to the attribute value of the name of the GUI component in the screen layout 900 that the user specified. Then the processing program and the method of the GUI component specified by the user are associated with the GUI component in the screen layout 910.

The above concerns the processing when the screen layout is replaced.

Figure 11:
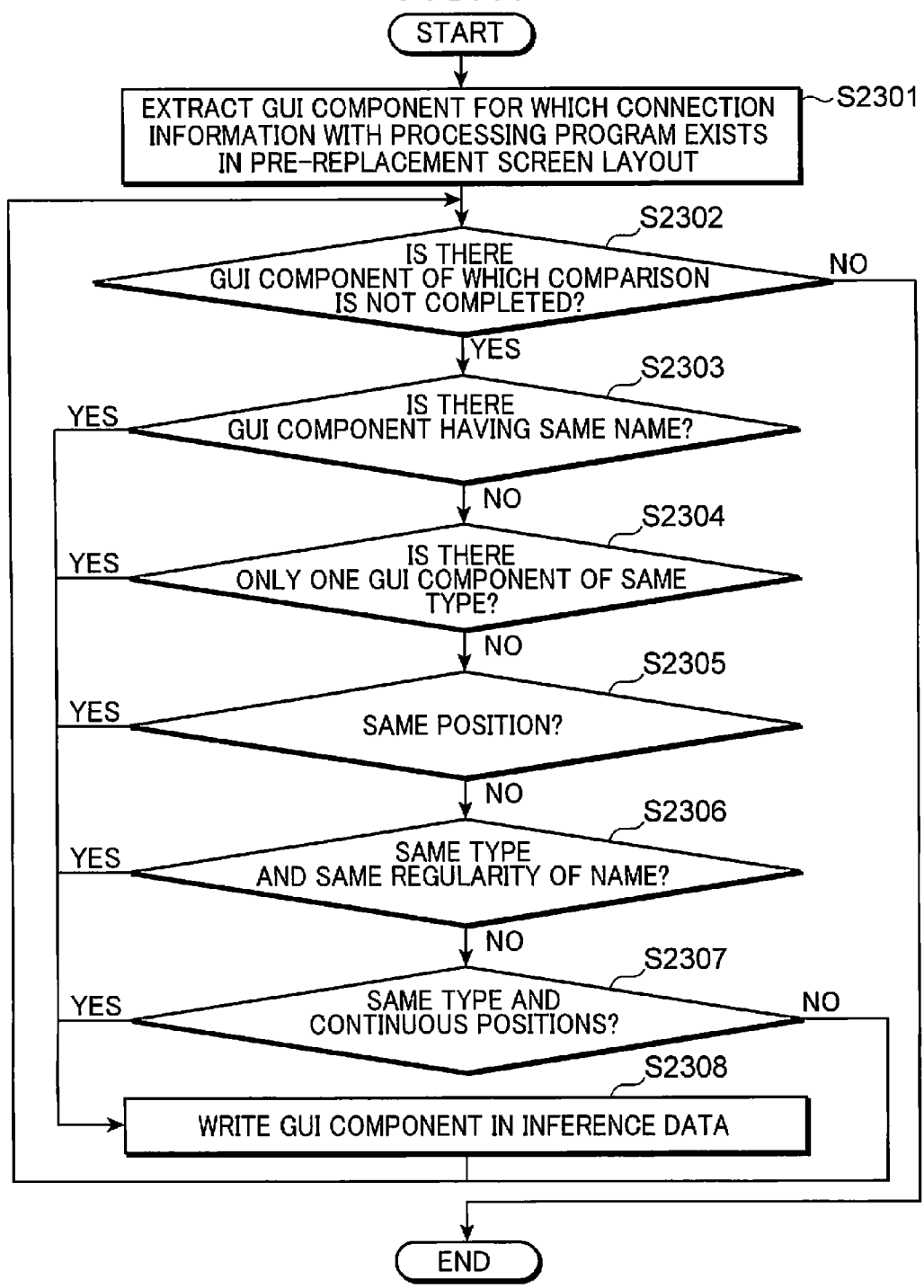
[FIG. 11]

Now the processing to compare the screen layout 900 and the screen layout 910 will be described in detail. FIG. 11 is a flow chart depicting a sub-routine of S2300 in FIG. 10.

In the following description, it is assumed that the attribute values of the names of GUI components are automatically generated by the screen layout creating unit 101, and do not overlap with one another.

First in the screen layout 900, the screen layout comparing unit 105 extracts each GUI component of which connection information 202 exist, where a processing program and a method are associated with this GUI component (S2301). Hereafter the extracted GUI components are compared with GUI components in the screen layout 910.

Then the screen layout comparing unit 105 determines whether there is a GUI component for which comparison is not completed among the GUI components extracted in S2301 (S2302). If there is a GUI component for which comparison is not completed (YES in S2302), the processing advances to S2303.

If comparison is completed for all the GUI components extracted in S2301 (NO in S2302), the processing ends.

Then in the screen layout 910, the screen layout comparing unit 105 determines whether there is a GUI component having a same attribute value of the name as that of a GUI component determined in S2302 that comparison was not completed (S2303). If it is determined that there is a GUI component having the same attribute value of the name (YES in S2303), the screen layout comparing unit 105 infers that these GUI components are similar, correlates these GUI components to each other, and writes this information in the inference data (S2308).

If it is determined that there is no GUI component having the same attribute value of the name (NO in S2303), the screen layout comparing unit 105 advances the processing to S2304.

In the screen layout creation process, for example, a new screen layout is often created by adding GUI components to a created screen layout or by deleting a part of GUI components. In this case, an attribute value of the name of an original GUI component is often used as is for the new screen layout. The processing in S2303 is effective in such a case.

Next in the screen layout 910, the screen layout comparing unit 105 determines whether there is a GUI component of which type is the same as a GUI component for which comparison is not completed in S2302, and whether the number of GUI components of this type is only one in both screen layouts (S2304).

If it is determined that there is a GUI component of which type is the same as the GUI component for which comparison is not completed in S2302, and the number of GUI components of this type is only one in both screen layouts (YES in S2304), then the screen layout comparison unit 105 infers that these GUI components are similar, correlates these GUI components to each other, and writes this information in the inference data (S2308).

Examples of the types of a GUI component are a button, a list and an image, and a GUI component is defined by a component class to which the GUI component belongs.

In the example of FIG. 8A and FIG. 8B, the type of the GUI component 904 in the screen layout 900 is a list. The type of the GUI component 914 in the screen layout 910 is also a list. In both of the screen layouts, there is only one GUI component of which type is a list. Therefore it is inferred that the GUI component 904 and the GUI component 914 are similar.

On the other hand, if there is no GUI component of a same type, or if there are two or more GUI components of a same type in both of the screen layouts (NO in S2304), the processing advances to S2305.

For example, a GUI having a video content is often constituted by: one GUI component of a list, which displays a list of files names or thumbnail images of the video content; and a GUI component of buttons for selecting and regenerating the video content displayed in the list.

Therefore the processing in S2304 is effective in such a screen layout that includes one GUI component of which type is a list. Here it is inferred that both GUI components are similar only when the number of GUI components of a same type is one, but the present invention is not limited to this. For example, it can be inferred that both GUI components are similar if there are the same number (two or more) of GUI components of a same type in the screen layout 900 and the screen layout 910. In this case, similarity of each GUI component constituting the same number (two or more) of GUI components is inferred based on the arrangement pattern, for example, of the same number of GUI components of the same type.

Then in the screen layout 910, the screen layout comparing unit 105 determines whether there is a GUI component having the same attribute value of the position as a GUI component for which comparison is not completed in S2302 (S2305). If it is determined that there is a GUI component having the same attribute value of the position (YES in S2305), then the screen layout comparing unit 105 infers that these GUI components are similar, correlates these GUI components to each other, and writes this information in the inference data (S2308).

If is determined that there is no GUI component having the same attribute value of the position (NO in S2305), the screen layout comparing unit 105 advances the processing to S2306. Here the screen layout comparing unit 105 may determine that the attribute value of the position is the same, even if some error exists in the attribute value of the position.

In concrete terms, the screen layout comparing unit 105 sets a lower threshold and an upper threshold for the X coordinate and the Y coordinate respectively. If there is a GUI component located within the lower threshold and the upper threshold in the X coordinate and the Y coordinate respectively in the screen layout 910, with respect to the attribute value of the position of the GUI component in the screen layout 900, the screen layout comparing unit 105 can infer that these GUI components are similar to each other.

In the screen layout creating process, for example, a new screen layout is often created by adding GUI components to a created screen layout or deleting a part of GUI components therefrom. In this case, a position of an original GUI component is often unchanged in the new screen layout. The processing in S2305 is effective in such a case.

In the GUI in a regular pattern, the arrangement positions of GUI components are often predetermined according to the type. Therefore GUI components arranged in a same position in the pre-replacement screen layout and the post-replacement screen layout have a higher possibility of being associated with a same processing program. Hence by the processing in S2305, the similarity of GUI components can be accurately inferred in a GUI in a regular pattern.

Then the screen layout comparing unit 105 specifies a GUI component group belonging to a same type, out of the GUI components for which comparison is not completed in S2302, and determines whether a GUI component group, of which type and regularity of names are the same as the GUI component group, exists in the screen layout 910 (S2306).

If it is determined that a GUI component group, of which type and regularity of names are the same, exists (YES in S2306), the screen layout comparing unit 105 extracts the same number of GUI components respectively from both GUI component groups, in the sequence from a smaller attribute value of a name, correlates the extracted GUI components to each other, and writes this information in the inference data (S2308).

If it is determined that a GUI component group, of which type and regularity of names are the same, does not exist (NO in S2306), the screen layout comparing unit 105 advances the processing to S2307.

An example of the regularity of names being the same between the GUI component groups is that one GUI component group is constituted by GUI components, of which attribute values of the names are "Button01", "Button02" and "Button03", and the other GUI component group is constituted by GUI components of which attribute values of names are "naviButton01", "naviButton02" and "naviButton03".

For example, it is assumed that in the screen layout 900, the attribute values of the names of the GUI components 901 to 903 are "Button01", "Button02" and "Button03". It is also assumed that in the screen layout 910, attribute values of the names of the GUI components 911 to 913 are "naviButton01", "naviButton02" and "naviButton03".

In this case, the type of GUI components 901 to 903 is a button, and the attribute values of names thereof have regularity, as in "Button01", "Button02" and "Button03". To be more concrete, the character string is the same, and a numeric value following the character string continuously increments by 1. Therefore the GUI components 901 to 903 are specified as a GUI component group.

The type of GUI components 911 to 913, on the other hand, is a button, and the attribute values of names thereof have regularity, as in "naviButton01", "naviButton02" and "naviButton03". Therefore the GUI components 911 to 913 are specified as a GUI component group.

In the GUI component group specified in the screen layout 900, the attribute value of the name is smaller in the sequence of the GUI component 901, the GUI component 902, and the GUI component 903. On the other hand, in the GUI component group specified in the screen layout 910, the attribute value of the name is smaller in the sequence of the GUI component 911, the GUI component 912, and the GUI component 913. Hence the screen layout comparing unit 105 infers that the GUI components 901 to 903 are similar to the GUI components 911 to 913 respectively, and correlates these GUI components to each other.

In some cases, the number of GUI components constituting a GUI component group specified in the screen layout 900 may not match with the number of GUI components constituting a GUI component group specified in the screen layout 910. For example, there are four GUI components 901 to 904 in the GUI component group in the screen layout 900, but there are only three GUI components 911 to 913 in the screen layout 910. In this case, if the attribute value of the name of the GUI component 904 is "Button04", the screen layout comparing unit 105 correlates the same number of GUI components to each other in the sequence of the attribute value of the name, such as correlating the GUI components 901 to 903 with the GUI components 911 to 913 respectively.

Then the screen layout comparing unit 105 specifies a group of GUI components of which positions are continuous, out of the GUI components for which comparison is not completed in S2302, and determines whether a group of GUI component groups, of which types are the same as this GUI component group and of which positions are continuous, exists (S2307). If it is determined that a group of GUI component groups, of which types are the same and of which positions are continuous, exists (YES in S2307), the screen layout comparing unit 105 extracts the same number of GUI components respectively from both GUI component groups, correlates the extracted GUI components to each other, and writes this information in the inference data (S2308).

If it is determined that a group of GUI components, of which types are the same and of which positions are continuous, does not exist (NO in S2307), the screen layout comparing unit 105 returns the processing to S2302.

Here "positions are continuous" refers to the fact that the GUI components are continuous in the vertical direction or the horizontal direction, for example.

In the screen layout 900 in FIG. 8A, the GUI components 901 to 903, of which types are the same, and of which positions are continuous in the horizontal direction, are specified as a GUI component group.

In the screen layout 910 in FIG. 8B, the GUI components 911 to 913, of which types are the same and of which positions are continuous in the vertical direction, are specified as a GUI component group. The type of this GUI component group is the same as that of the GUI components 901 to 903. In the GUI component group in the screen layout 900, the GUI component 901 is located at the left end, and in the GUI component group in the screen layout 910, the GUI component 911 is located at the upper end. Therefore it is inferred that the GUI component 901 and the GUI component 911 are similar, and these GUI components are correlated to each other.

The GUI components 902 and 903 are located in the second and third places from the left in the GUI component group in the screen layout 900, and the GUI components 912 and 913 are located in the second and third places from the top in the GUI component group in the screen layout 910. Therefore the GUI component 902 and the GUI component 912 are correlated to each other, and the GUI component 903 and the GUI component 913 are correlated to each other.

In some cases, the number of GUI components may not match between the GUI component groups, such as the case of the GUI component group in the screen layout 900 constituted by four GUI components 901 to 904, which are arranged continuously in the horizontal direction. In such a case, three GUI components 901 to 903 from the left end in the GUI component group in the screen layout 900 can be correlated to the three GUI components 911 to 913 from the top in the GUI component group in the screen layout 910 respectively.

If S2307 is NO, the correlation between the GUI components is not written in the inference data, and the processing returns to S2302.

The above details the processing for comparing the screen layouts.

<Modification 1>

A modification 1 of the above mentioned GUI program creation supporting apparatus 100 will now be described. This modification is characterized in that the user inputs pattern information that indicates an arrangement pattern of GUI components in the screen layout, and the sequence of inference processing described in S2303 to S2307 in FIG. 11 is changed appropriately according to the pattern information.

In the modification 1, the screen layout creating unit 101 sets the pattern information that indicates an arrangement pattern of GUI components in the screen layout, based on an operation input by the user. In concrete terms, in the screen layout creating operation, the screen layout creating unit 101 allows the user to select one pattern information out of a predetermined plurality of pattern information. By writing the pattern information selected by the user in the screen layout definition information 201, the pattern information is set in the screen layout.

The pattern information available here includes: a video content pattern that indicates an arrangement pattern of GUI components in a video content screen layout; an operation menu pattern that indicates an arrangement pattern of GUI components in an operation menu screen layout; and a standard pattern that indicates an arrangement pattern of GUI components in a standard screen layout.

The video content pattern is created assuming, for example, an arrangement pattern of GUI components of a GUI is used, where the user selects a content out of a plurality of video contents when the user regenerates a video content in such an AV apparatus as a DVD recorder.

The operation menu pattern is created assuming, for example, an arrangement pattern of GUI components of a GUI of an operation menu is used, which is displayed on a screen to operate a digital apparatus such as an AV apparatus and a car navigation system.

A standard pattern is created assuming an arrangement pattern of GUI components of a standard GUI is used, of which arrangement positions of GUI components are predetermined in a specification, according to the type of GUI components.

A GUI of a video content is often constituted by one list of GUI components displaying a list of file names or thumbnail images of video contents, and a plurality of buttons of GUI components for selecting and regenerating to video content out of the displayed list.

To design such a GUI, it is highly possible that one list of GUI components is included in both the pre-replacement screen layout and the post-replacement screen layout.

Therefore if the pattern information indicates the video content pattern, the screen layout comparing unit 105 executes the inference processing to determine whether "there is only one component of a same type" in S2304 of FIG. 11 (an example of the first inference processing) immediately following S2302, then sequentially executes the rest of the inference processing in S2303 and S2305 to S2307. Thereby the GUI components can be accurately inferred in the screen layout applied to the GUI of the video contents.

In a GUI of an operation menu, in many cases the GUI components of a same type are regularly arranged, such as a plurality of GUI components of a button that is arranged continuously, and a plurality of GUI components of an image that is arranged continuously.

Therefore if the pattern information indicates the operation menu pattern, the screen layout comparing unit 105 executes the inference processing to determine whether the GUI components are the "same type and continuous positions" in S2307 (an example of the second inference processing) immediately following S2302, then sequentially executes the inference processing in S2303 to S2306. Thereby the similarity of GUI components can be inferred accurately in the screen layout applied to the GUI of the operation menu.

In a GUI of a standard pattern, the arrangement positions of GUI components are predetermined according to the type thereof. Therefore it is highly possible that GUI components arranged in the same positions in the pre-replacement screen layout and the post-replacement screen layout are associated with a same processing program.

Therefore if the pattern information indicates the standard pattern, the screen layout comparing unit 105 executes the inference processing to determine whether the GUI components are the "same position" in S2305 (an example of the third inference processing) immediately following to S2302, then sequentially executes the inference processing in S2303, S2304, S2306 and S2307. Thereby the similarity of the GUI components can be accurately inferred in the screen layout applied to the GUI of the standard pattern.

Thus according to modification 1, the inference processing having high inference accuracy is applied with precedence according to the type of GUI to which the screen layout is applied, hence the processing to compare and discern similarity of GUI components can be executed efficiently.

In modification 1, the user selects one pattern information, but the present invention is not limited to this, and a plurality of pattern information may be selected. In this case, precedence is set in advance for each pattern information, and if a plurality of pattern information is set, the sequence of the inference processing is determined according to the precedence.

For example, it is assumed that a user sets a video content pattern and an operation menu pattern as the pattern information, and the precedence of the video content pattern is higher than that of the operation menu pattern. In this case, the screen layout comparing unit 105 executes the inference processing in S2304 immediately following the inference processing in S2302, then executes the inference processing in S2307, and finally the rest of the inference processing are sequentially executed.

<Modification 2>

In the above mentioned embodiment, an attribute value of a name of a GUI component in the post-replacement screen layout is updated to an attribute value of a name of the correlated GUI component in the pre-replacement screen layout. In modification 2, an attribute value of a name of a GUI component in the pre-replacement screen layout is updated to an attribute value of a name of the correlated GUI component in the post-replacement screen layout.

For example, if an attribute value of a name of a GUI component in the post-replacement screen layout is "Button_01", and an attribute value of a name of a GUI component in the pre-replacement screen layout is "Button_A", then "Button_A" is updated to "Button_01".

The designer may edit the pre-replacement screen layout again after creating the post-replacement screen layout. In this case, the designer, who set the attribute value of the name of the GUI component (B1) as "Button_01" in the post-replacement screen layout, cannot quickly recognize whether the GUI component of which attribute value of the name is "Button_A" is the GUI component (B1) or not in the pre-replacement screen layout.

Therefore if an attribute value of a name of a GUI component in the post-replacement screen layout is set for a GUI component in the pre-replacement screen layout, the editing work of the pre-replacement screen layout can be more efficient.

In this case, association of the GUI component 901 with the processing program is cancelled, so a processing program must be associated with the GUI component 901. For example, in FIG. 8A and FIG. 8B, it is assumed that the GUI components 901 and 911 are correlated to each other. In this case, the connection information restoring unit 106 can change the attribute value of the name from "Button_A" to "Button_01" in the connection information 202 of the GUI component 901. Then association with the processing program is restored for both the GUI components 901 and 911.

<Modification 3>

In the above embodiment, a processing program is associated with the post-replacement screen layout based on the similarity of the pre-replacement screen layout and the post-replacement screen layout. Modification 3 is characterized in that a processing program to be associated with each GUI component in the post-replacement screen layout is inferred based on the characteristic of the processing program associated with the pre-replacement screen layout.

For example, it is assumed that the pre-replacement screen layout is a screen layout to regenerate video contents in an AV apparatus offline, and this pre-replacement screen layout is replaced with a screen layout to regenerate the video contents on the Internet online.

It is also assumed that in this pre-replacement screen layout, a regeneration program for offline is associated with a GUI component of a regeneration button, for example. Then the screen layout comparing unit 105 associates a regeneration program for online corresponding to the regeneration program for offline, with the GUI component of the regeneration button.

Here the screen layout comparing unit 105 can specify a regeneration program for online based on the name and selectable method type of the regeneration program for offline, for example. In concrete terms, if the name of the regeneration program for offline is "off_play_program" and the name of the regeneration program for online is "on_play_program", and the similarity of the names of these programs is high, then this "on_play_program" is associated with the GUI component of the regeneration button. Similarity can be determined by the number of characters that match in both names.

If the similarity of methods of both programs is high, such as in the case of both "off_play_program" and "on_play_program" having the methods "play", "stop", "fforward" and "rewind", then "on_play_program" can be associated with the GUI component of the regeneration button. The similarity of the methods can be determined by the number of methods that match in both programs.

It is assumed that "off_play_program" and "on_play_program" are correlated with each other by a programmer in advance. In this case, the screen layout comparing unit 105 can associate "on_play_program" correlated to "off_play_program" with the GUI component of the regeneration button.

This configuration is also effective when the processing program associated with the pre-replacement screen layout is upgraded.

For example, it is assumed that in the pre-replacement screen layout, "play_program (ver. 1)" is associated with a GUI component of the regeneration button, and a next generation "play_program (ver. 2)" is correlated with this "play_program (ver. 1)".

Then the screen layout comparing unit 105 associates "play_program (ver. 2)" with the GUI component of the regeneration button in the post-replacement screen layout.

Figure 13:
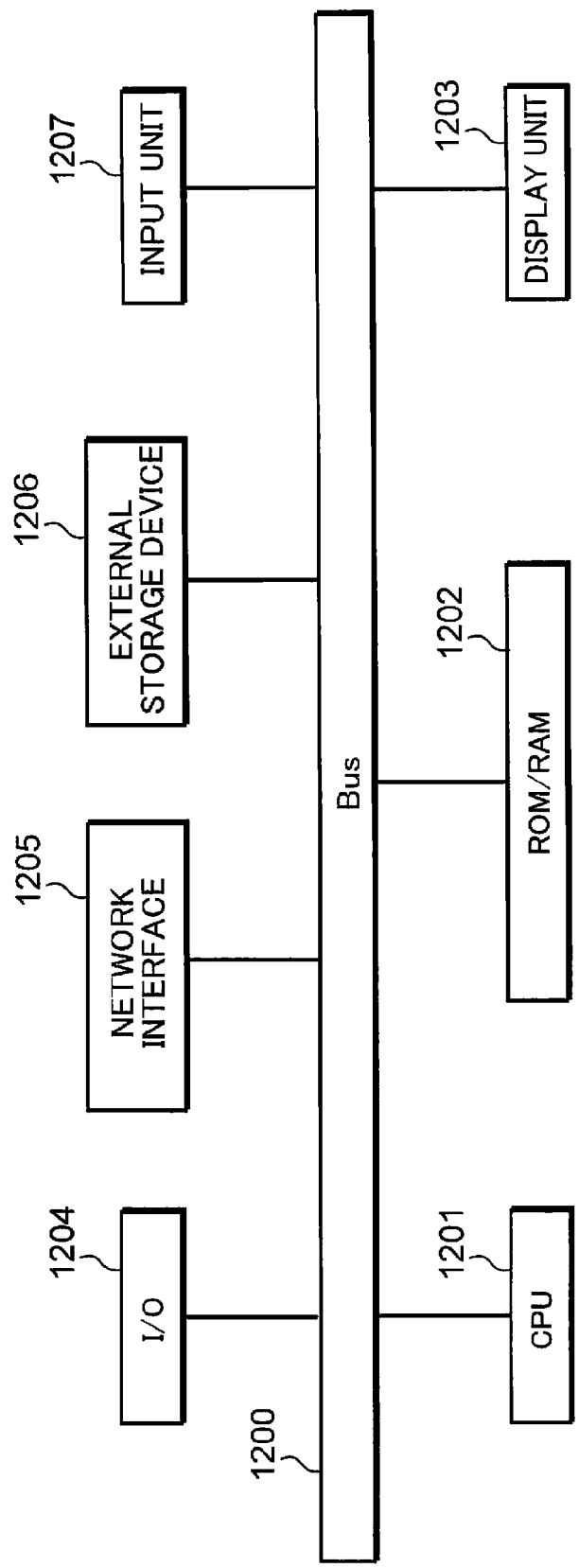
[FIG. 13]

FIG. 13 is a block diagram depicting a hardware configuration of the GUI program creation supporting apparatus 100 according to the embodiment of the present invention. The GUI program creation supporting apparatus 100 is provided with a CPU (Central Processing Unit) 1201, a ROM/RAM 1202, a display unit 1203, an I/O 1204, a network interface 1205, an external storage device 1206, and an input unit 1207. The CPU 1201 to the input unit 1207 are interconnected via a bus 1200.

The ROM/RAM 1202 or the external storage device 1206 stores programs for the computer to function as the GUI program creation supporting apparatus 100.

The display unit 1203 is constituted by a liquid crystal display, an organic EL display or the like, and displays a processing result processed by the CPU 1201.

The I/O 1204 is an input/output interface for connecting an external device, such as a USB port. The network interface 1205 is constituted by a communication circuit for connecting the GUI program creation supporting apparatus 100 to the Internet, for example. The external storage device 1206 is constituted by such a storage device as an HDD (Hard Disk Device). The input unit 1207 is constituted by such an input device as a keyboard and a mouse, and accepts various operation inputs by the user.

The screen layout creating unit 101, the connection setting unit 102 and the processing program creating unit 103 shown in FIG. 1 are program modules that display a predetermined GUI on the display unit 1203, so as to accept an operation input by the user via the GUI, are stored in the ROM/RAM 1202 or the external storage device 1206, and executed by the CPU 1201.

The source code generating unit 104, the screen layout comparing unit 105 and the connection information restoring unit 106 shown in FIG. 1 are program modules that do not display a GUI, are stored in the ROM/RAM 1202 or the external storage device 1206, and are executed by the CPU 1201. The storage unit 200 shown in FIG. 1 is constituted by the ROM/RAM 1202 or the external storage device 1206, for example.

The GUI program creation supporting apparatus 100 shown in FIG. 1 may be implemented as an LSI, an integrated circuit. In this case, the screen layout creating unit 101 to the connection information restoring unit 106 shown in FIG. 1 are integrated. Then it is unnecessary to load programs from the ROM/RAM 1202 or the external storage device 1206 to the CPU 1201. These functional blocks may be integrated into one chip respectively, or a part or all thereof may be integrated into one chip.

Here "LSI" is used, but the integrated circuit may be called an IC, a system LSI, a super LSI or an ultra LSI, depending on the degree of integration.

The method for integrating the circuits is not limited to an LSI, but may be implemented by a dedicated circuit or a universal processor. An FPGA (Field Programmable Gate Array) that can be programmed after the LSI is manufactured, or a reconfigurable processor, that can reconfigure connections and settings of the circuit cells inside the LSI, may also be used.

Should an integrated circuit technology, that can replace an LSI, be released by advancements in semiconductor technology, or by different technologies derived therefrom, then the functions blocks could be integrated using that technology. Biotechnology may also be adapted for these purposes.

Among the composing elements of the GUI program creation supporting apparatus 100, the storage unit 200 may be integrated into one chip, along with the screen layout creating unity 101 to the connection information restoring unit 106.

This embodiment can be implemented as a method regarding processing means constituting the GUI program creation supporting apparatus 100 as a step. This embodiment can also be implemented as a program that causes a computer to execute the steps included in the method. This embodiment can also be implemented as a computer-readable storage media, such as a CD-ROM, storing this program.

(Summary of GUI Program Creation Supporting Apparatus of this Embodiment)

(1) A GUI program creation supporting apparatus of this embodiment comprises: a screen layout creating unit that generates a screen layout of a GUI (Graphical User Interface) including a plurality of GUI components based on an operation input by a user, and replaces a generated screen layout with another screen layout; a processing program creating unit that, based on an operation input by the user, creates a processing program related to processing to be executed when any of the GUI components is operated; a connection setting unit that, based on an operation input by the user, associates the GUI component with the processing program, and generates connection information to indicate the association; a source code generating unit that generates a source code of a GUI program based on the screen layout, the processing program and the connection information; a screen layout comparing unit that, in the case where the generated screen layout is replaced with another screen layout by the screen layout creating unit, infers a GUI component in the pre-replacement screen layout, that is similar to a GUI component in the post-replacement screen layout, and correlates the GUI components similar to each other; and a connection information restoring unit that executes connection restoring processing to associate the processing program, which is associated with the GUI component in the pre-replacement screen layout, with the GUI component correlated by the screen layout comparing unit.

According to this configuration, for each GUI component of the post-replacement screen layout, a similar GUI component is inferred in the pre-replacement screen layout, and a GUI component in the post-replacement screen layout, that is inferred that a similar GUI component exists, is automatically associated with a processing program that is associated with a the similar GUI component.

Therefore burden on the user to perform operations to associate a processing program in the post-replacement screen layout is decreased, and the development efficiency of the screen layout of a GUI can be dramatically improved.

(2) It is preferable that the connection information restoring unit notifies the user of the GUI component correlated by the screen layout comparing unit, and executes the connection restoring processing for the GUI component for which the user inputs an operation to indicate that the inference result is correct.

According to this configuration, the user can determine whether the inference result is correct in advance, and associating a processing program, with a GUI component in the post-replacement screen layout against user' intention is prevented, which improves operation efficiency.

(3) It is preferable that the screen layout comparing unit infers a similarity by comparing a name assigned to each of the GUI components between the post-replacement screen layout and the pre-replacement screen layout.

According to this configuration, in the case where names of many GUI components used in the post-replacement screen layout are the same as those used in the pre-replacement screen layout, similar GUI components can be inferred accurately.

(4) It is preferable that the screen layout comparing unit infers a similarity by comparing the number of GUI components of the same type between the post-replacement screen layout and the pre-replacement screen layout.

According to this configuration, similar GUI components can be accurately inferred in a screen layout of a GUI with a video content which has one GUI component of a list.

(5) It is preferable that the screen layout comparing unit infers a similarity by comparing a continuity in a name assigned to each of the GUI components between the post-replacement screen layout and the pre-replacement screen layout.

According to this configuration, similar GUI components can be accurately detected in a screen layout for which names of GUI components are automatically created under a predetermined rule.

(6) It is preferable that the screen layout comparing unit infers a similarity by comparing a position of each of the GUI components between the post-replacement screen layout and the pre-replacement screen layout.

According to this configuration, the similarity of GUI components can be accurately inferred in a screen layout that is applied to a GUI in a standard pattern in which the arrangement positions of the GUI components are predetermined by specification.

(7) It is preferable that the screen layout comparing unit infers a similarity by comparing a regularity of arrangement of each of the GUI components between the post-replacement screen layout and the pre-replacement screen layout.

According to this configuration, similar GUI components can be accurately detected in a screen layout of a GUI of an operation menu that is displayed on the screen to operate an AV apparatus or the like.

(8) It is preferable that the connection information restoring unit updates a name of the GUI component in the post-replacement screen layout for which the connection restoring processing has been executed, to a name of the correlated GUI component in the pre-replacement screen layout.

According to this configuration, a processing program of a GUI component in the pre-replacement screen layout can be associated with a GUI component in the post-replacement screen layout, without generating new connection information and new source code for the GUI component of the post-replacement screen layout.

(9) It is preferable that the connection information restoring unit updates a name of the GUI component in the pre-replacement screen layout to a name of the correlated GUI component in the post-replacement screen layout for which the connection restoring processing has been executed.

According to this configuration, the editing operation, when the pre-replacement screen layout is reedited, can be made efficient.

(10) It is preferable that the screen layout generating unit sets pattern information to indicate an arrangement pattern of the GUI components in the screen layout based on an operation input by the user, and the screen layout comparing unit infers a similarity by sequentially executing a plurality of inference processing steps and changes the sequence of the inference processing steps according to the pattern information.

According to this configuration, inference processing having high inference accuracy is used with precedence, depending on the type of GUI to which the screen layout is applied, hence processing to compare and determine similarity between GUI components can be executed efficiently.

(11) It is preferable that the inference processing includes first inference processing for inferring a similarity by comparing the number of GUI components of the same type between the post-replacement screen layout and the pre-replacement screen layout, and the screen layout comparing unit executes the first inference processing first if the pattern information is a video content pattern that indicates an arrangement pattern of GUI components of a GUI having video content.

According to this configuration, similar GUI components can be inferred more accurately in a screen layout having one GUI component of a list, just like the case of a GUI of video contents.

(12) It is preferable that the inference processing includes second inference processing for inferring a similarity by comparing a regularity of arrangement of each of the GUI components between the post-replacement screen layout and the pre-replacement screen layout, and the screen layout comparing unit executes the second inference processing first if the pattern information is an operation menu pattern that indicates an arrangement pattern of GUI components of a GUI for an operation menu.

According to this configuration, similar GUI components can be inferred more accurately in a screen layout of such a GUI as an operation menu, that is displayed on the screen to operate an AV apparatus or the like.

(13) It is preferable that the inference processing includes third inference processing for inferring a similarity by comparing a position of the GUI component between the post-replacement screen layout and the pre-replacement screen layout, and the screen layout comparing unit executes the third inference processing first if the pattern information is a standard pattern that indicates a standard GUI where GUI components are arranged in predetermined arrangement positions.

According to this configuration, similarity of GUI components can be inferred more accurately in a screen layout that is applied to a GUI in a standard pattern, in which the arrangement positions of the GUI components are predetermined by specification.

INDUSTRIAL APPLICABILITY

The GUI program creation supporting apparatus according to the present invention is useful as a GUI builder which has a screen layout comparing unit and a connection information restoring unit, and improves efficiency of developing a GUI program that is developed with replacing a plurality of screen layouts.

The invention claimed is:
1. A GUI program creation supporting apparatus, comprising:
   a processor
   a screen layout creating unit that generates a screen layout of a GUI (Graphical User Interface) including a plurality of GUI components based on an operation input by a user, and replaces a generated screen layout with another screen layout;

a processing program creating unit that, based on an operation input by the user, creates a processing program related to processing to be executed when any of the GUI components is operated;

a connection setting unit that, based on an operation input by the user, associates the GUI component with the processing program, and generates connection information to indicate the association;

a source code generating unit that generates a source code of a GUI program based on the screen layout, the processing program and the connection information;

a screen layout comparing unit that, in the case where the generated screen layout is replaced with another screen layout by the screen layout creating unit, infers a GUI component in the pre-replacement screen layout, that is similar to a GUI component in the post-replacement screen layout, and correlates the GUI components similar to each other; and a connection information restoring unit that executes connection restoring processing to associate the processing program, which is associated with the GUI component in the pre-replacement screen layout, with the GUI component correlated by the screen layout comparing unit.

2. The GUI program creation supporting apparatus according to claim 1, wherein
the connection information restoring unit notifies the user of the GUI component correlated by the screen layout comparing unit, and executes the connection restoring processing for the GUI component for which the user inputs an operation to indicate that the inference result is correct.

3. The GUI program creation supporting apparatus according to claim 1, wherein
the screen layout comparing unit infers a similarity by comparing a name assigned to each of the GUI components between the post-replacement screen layout and the pre-replacement screen layout.

4. The GUI program creation supporting apparatus according to claim 1, wherein
the screen layout comparing unit infers a similarity by comparing the number of GUI components of the same type between the post-replacement screen layout and the pre-replacement screen layout.

5. The GUI program creation supporting apparatus according to claim 1, wherein
the screen layout comparing unit infers a similarity by comparing a continuity in a name assigned to each of the GUI components between the post-replacement screen layout and the pre-replacement screen layout.

6. The GUI program creation supporting apparatus according to claim 1, wherein
the screen layout comparing unit infers a similarity by comparing a position of each of the GUI components between the post-replacement screen layout and the pre-replacement screen layout.

7. The GUI program creation supporting apparatus according to claim 1, wherein
the screen layout comparing unit infers a similarity by comparing a regularity of arrangement of each of the GUI components between the post-replacement screen layout and the pre-replacement screen layout.

8. The GUI program creation supporting apparatus according to claim 1, wherein
the connection information restoring unit updates a name of the GUI component in the post-replacement screen layout for which the connection restoring processing has been executed, to a name of the correlated GUI component in the pre-replacement screen layout.

9. The GUI program creation supporting apparatus according to claim 1, wherein
the connection information restoring unit updates a name of the GUI component in the pre-replacement screen layout to a name of the correlated GUI component in the post-replacement screen layout for which the connection restoring processing has been executed.

10. The GUI program creation supporting apparatus according to claim 1, wherein
the screen layout generating unit sets pattern information to indicate an arrangement pattern of the GUI components in the screen layout based on an operation input by the user, and
the screen layout comparing unit infers a similarity by sequentially executing a plurality of inference processing steps and changes the sequence of the inference processing steps according to the pattern information.

11. The GUI program creation supporting apparatus according to claim 10, wherein
the inference processing includes first inference processing for inferring a similarity by comparing the number of GUI components of the same type between the post-replacement screen layout and the pre-replacement screen layout, and
the screen layout comparing unit executes the first inference processing first if the pattern information is a video content pattern that indicates an arrangement pattern of GUI components of a GUI having video content.

12. The GUI program creation supporting apparatus according to claim 10, wherein
the inference processing includes second inference processing for inferring a similarity by comparing a regularity of arrangement of each of the GUI components between the post-replacement screen layout and the pre-replacement screen layout, and
the screen layout comparing unit executes the second inference processing first if the pattern information is an operation menu pattern that indicates an arrangement pattern of GUI components of a GUI for an operation menu.

13. The GUI program creation supporting apparatus according to claim 10, wherein
the inference processing includes third inference processing for inferring a similarity by comparing a position of the GUI component between the post-replacement screen layout and the pre-replacement screen layout, and
the screen layout comparing unit executes the third inference processing first if the pattern information is a standard pattern that indicates a standard GUI where GUI components are arranged in predetermined arrangement positions.

14. A GUI program creation supporting method, comprising:
a screen layout creating step in which a computer generates a screen layout of a GUI (Graphical User Interface) including a plurality of GUI components based on operation input by a user, and replaces a generated screen layout with another screen layout;

a processing program creating step in which the computer, based on an operation input by the user, creates a processing program related to processing to be executed when any of the GUI components is operated;

a connection setting step in which the computer, based on an operation input by the user, associates the GUI component with the processing program, and generates connection information to indicate the association;

a source code generating step in which the computer generates a source code of a GUI program based on the screen layout, the processing program and the connection information;

a screen layout comparing step in which in the case where the generated screen layout is replaced with another screen layout in the screen layout creating step, the computer infers a GUI component in the pre-replacement screen layout, that is similar to a GUI component in the post-replacement screen layout, and correlates the GUI components similar to each other; and a connection information restoring step in which the computer executes connection restoring processing to associate the processing program, which is associated with the GUI component in the pre-replacement screen layout, with the GUI component correlated in the screen layout comparing step.

15. A computer-readable medium which stores a program causing a computer to function as:

a screen layout creating unit that generates a screen layout of a GUI (Graphical User Interface) including a plurality of GUI components based on an operation input by a user, and replaces a generated screen layout with another screen layout;

a processing program creating unit that, based on an operation input by the user, creates a processing program related to processing to be executed when any of the GUI components is operated;

a connection setting unit that, based on an operation input by the user, associates the GUI component with the processing program, and generates connection information to indicate the association;

a source code generating unit that generates a source code of a GUI program based on the screen layout, the processing program and the connection information;

a screen layout comparing unit that, in the case where the generated screen layout is replaced with another screen layout by the screen layout creating unit, infers a GUI component in the pre-replacement screen layout, that is similar to a GUI component in the post-replacement screen layout, and correlates the GUI components similar to each other; and a connection information restoring unit that executes connection restoring processing to associate the processing program, which is associated with the GUI component in the pre-replacement screen layout, with the GUI component correlated by the screen layout comparing unit.

16. An integrated circuit, comprising:

a processor;

a screen layout creating unit that generates a screen layout of a GUI (Graphical User Interface) including a plurality of GUI components based on an operation input by a user, and replacing a generated screen layout with another screen layout;

a processing program creating unit that, based on an operation input by the user, creates a processing program related to processing to be executed when any of the GUI components is operated;

a connection setting unit that, based on an operation input by the user, associates the GUI component with the processing program, and generates connection information to indicate the association;

a source code generating unit that generates a source code of a GUI program based on the screen layout, the processing program and the connection information;

a screen layout comparing unit that, in the case where the generated screen layout is replaced with another screen layout by the screen layout creating unit, infers a GUI component in the pre-replacement screen layout, that is similar to a GUI component in the post-replacement layout, and correlates the GUI components similar to each other; and a connection information restoring unit that executes connection restoring processing to associate the processing program, which is associated with the GUI component in the pre-replacement screen layout, with the GUI component correlated by the screen layout comparing unit.

\* \* \* \* \*